April 20, 1937. R. M. THOMSON 2,077,910
FLYING MACHINE
Filed July 28, 1933 2 Sheets-Sheet 1
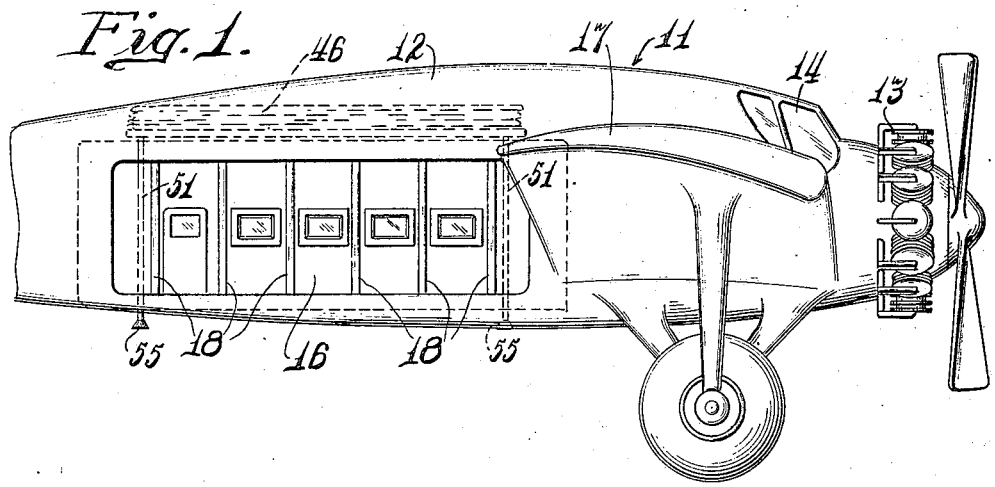
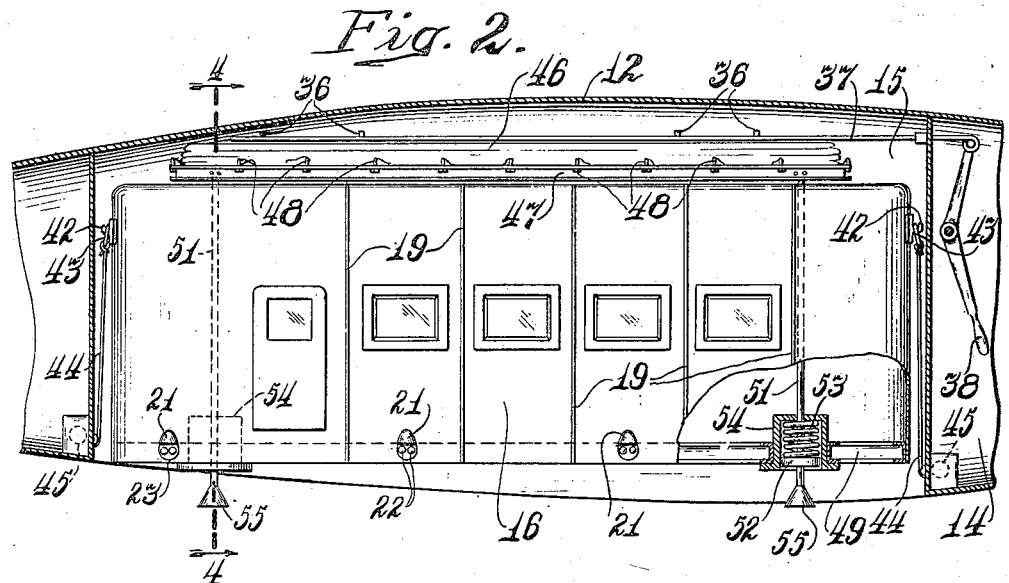
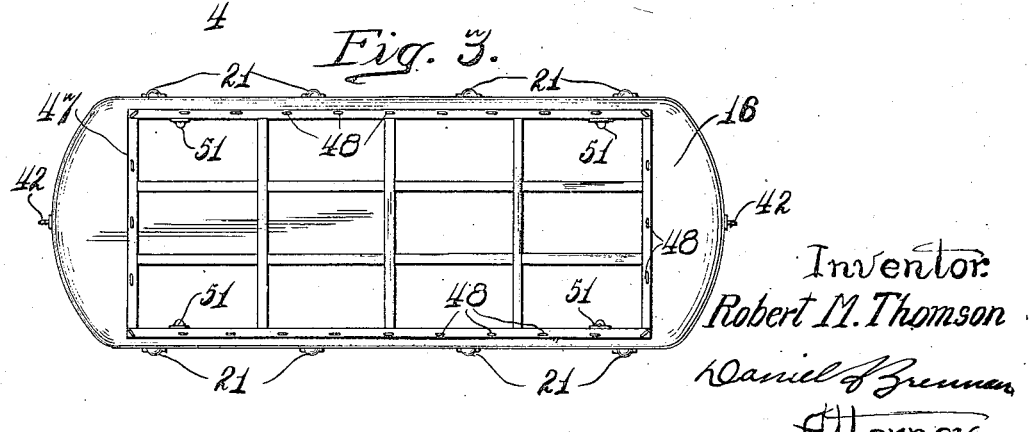
Inventor:
Robert M. Thomson
Daniel J. Brennan
Attorney.

April 20, 1937.  R. M. THOMSON  2,077,910
FLYING MACHINE
Filed July 28, 1933   2 Sheets-Sheet 2
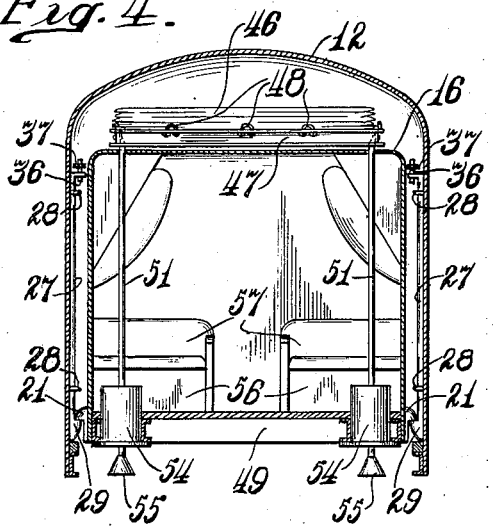
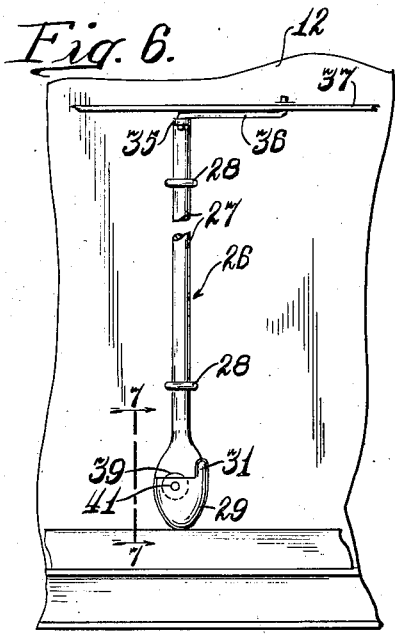
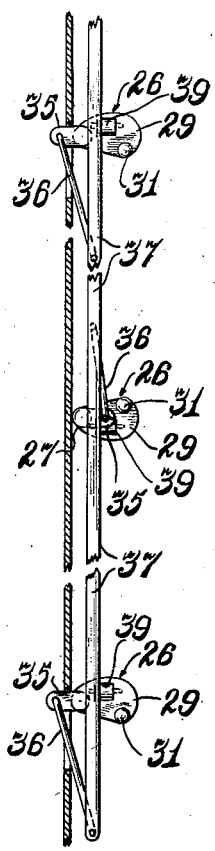
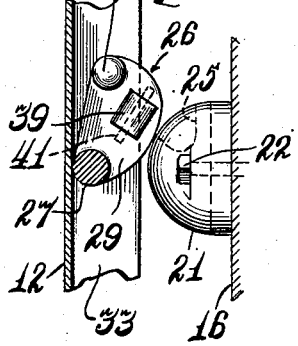
Inventor.
Robert M. Thomson
Daniel Brennan
Attorney.

Patented Apr. 20, 1937

2,077,910

UNITED STATES PATENT OFFICE 2,077,910

FLYING MACHINE

Robert M. Thomson, Indianapolis, Ind.

Application July 28, 1933, Serial No. 682,589

14 Claims. (Cl. 244—140)

The invention relates to improvements in flying machines and particularly to improved means for supporting a detachable cabin within the fuselage of an aeroplane, and for checking its descent when released.

An object of the invention is to provide a flying machine with novel means for releasably retaining a detachable cabin within the fuselage thereof.

Another object is to provide a detachable cabin for flying machines with improved means for mounting a parachute thereon.

Another object is to provide a detachable cabin for flying machines with improved shock absorbing means.

Another object is to provide automatic means within the fuselage of an aeroplane for urging a detachable cabin therefrom upon release of suitable locking means.

Another object is to provide a passenger or freight cabin for flying machines with means for maintaining it bouyant should it descend upon water.

The foregoing and such other objects of the invention as will appear hereinafter as the description proceeds, will be more readily understood from a perusal of the following specification, reference being had to the accompanying drawings, in which:

Fig. 1 is a fragmentary side elevational view of a flying machine, showing the detachable cabin mounted therein.

Fig. 2 is an enlarged fragmentary longitudinal vertical sectional view through the fuselage of the flying machine, showing the cabin in elevation.

Fig. 3 is a plan view of the cabin with the parachute removed.

Fig. 4 is a vertical transverse sectional view, taken on line 4—4 of Fig. 2.

Fig. 5 is a fragmentary sectional plan view of one of the fuselage side walls, showing the cabin supporting means arranged therealong.

Fig. 6 is an inside elevational view of a fragment of the fuselage wall, showing one of the locking devices.

Fig. 7 is an enlarged side elevational view of the locking device, showing the cabin in place, taken substantially on line 7—7 of Fig. 6.

Fig. 8 is a horizontal sectional view of the locking device, taken on line 8—8 of Fig. 7.

Fig. 9 is a view similar to Fig. 8, showing the component parts of the locking device disengaged.

The flying machine 11 shown in the drawings may be any type of flying machine employed for passenger or commercial flying, consisting of a fuselage 12, power plant 13, and a pilot's cabin 14. The fuselage 12 preferably is provided with a suitable receptacle 15 opening onto the bottom of the fuselage, for receiving a detachable cabin 16. This cabin may be of any standard or approved construction equipped to handle passengers or merchandise. The cabin 16 is detachably secured within the fuselage of the aeroplane by improved securing means, preferably operable from the pilot's cabin 14. Securing means operable in this manner permits the pilot or operator to release the cabin while in flight, in the event of disaster.

The detachable cabin also serves for other than safety purposes, such as enabling the pilot to safely discharge a load of merchandise or passengers without attempting to land the flying machine. This feature is particularly advantageous when the load is to be delivered at points not adequately equipped for the safe landing of a flying machine. Seperate cabins may be loaded prior to the arrival of the flying machine, and upon landing, the pilot may discharge a loaded cabin and receive in place thereof, one to be transported to another air port, without awaiting unloading and loading of the machine proper.

The cabin 16 is adapted to be mounted within the fuselage 12, as aforementioned, to the rear of the pilot's cabin 14 and wings 17. The opening 15 in the fuselage preferably is formed to substantially conform to the contour of the cabin, and is provided with a plurality of spaced vertical guide channels 18. Guides 19, which can be of any suitable form, are secured to the outside of the cabin walls at intervals corresponding to the spacing of the guide channels 18. The guides 19 are adapted to engage in the channels 18 when the cabin is placed within the fuselage. In addition to providing means to guide the cabin into place upon its insertion within the fuselage, the channels 18 serve to strengthen the fuselage at a point where most of the body thereof has been removed.

The cabin may be inserted through the bottom of the fuselage in any approved and practical manner, this preferably being accomplished by positioning the aeroplane on an elevated platform or runway and raising the cabin into position by any suitable elevating means from below. When the cabin is properly positioned within the fuselage, it is detachably secured therein by the improved locking mechanism operable from the pilot's cabin.

Suitable locking means is provided to retain the cabin within the fuselage, the component parts of which are secured respectively to the inside face of the side walls of the fuselage and walls of the cabin. Arranged preferably adjacent the bottom edge of the outside wall of the cabin 16, at spaced intervals, are a plurality of lugs 21. Each of said lugs is secured to the wall of the cabin in any suitable manner, such as by bolts or rivets 22, which pass through suitable apertures in a downwardly extending flange 23 formed integral with each lug. The lugs 21 preferably are formed with a round upper surface, and each is provided with a flat under-cut face or shoulder 24 having a cut-out portion or recess 25 extending inwardly and upwardly on one side thereof.

Arranged on the inside wall of the fuselage 12, within the opening 15 and in alignment with lugs 21, when the cabin is positioned in said opening, are locking members 26. Each locking member 26 preferably comprises a vertically arranged shaft 27 rotatably mounted on the inside face of the fuselage wall in suitable bearing members 28.

A foot portion 29, preferably formed integral with the shaft 27, preferably extends at right angles from said shaft, and when in locking position, projects beneath the respective lug 21 on the cabin. When in locked position, such as shown in Figs. 4 to 8, inclusive, a vertically extending portion 31 formed on each foot portion 29 engages in the recess 25 in the respective lug 21. It will be noted by reference to Fig. 5, that the portions 31 on alternate locking members are arranged on opposed sides to provide right and left hand locks.

The entire weight of the cabin 15 is transferred through the locking members to a bearing plate 33 mounted upon the fuselage frame 34. To provide for free rotation of the lock members 26, to release the cabin, the lower faces of the foot portions 29 are rounded to provide bearing surfaces which rest upon the bearing plate 33.

The upper end of each shaft 27 preferably has an arm 35 which is connected, by a link 36, to one of a pair of control rods 37, one of which extends longitudinally on each side and adjacent the upper extremity of the opening 15. The control rods 37, preferably extend forwardly into the pilot's cabin 14, and are operatively connected with an operating lever 38 arranged within easy reach of the pilot. Manipulation of the operating lever 38 moves the control rods 37 longitudinally, thus rotating the shafts 27 in a direction determined by their link connection to said rods to effect engagement or disengagement of the foot portions 29 with lugs 21. To further facilitate free rotation of shafts 27 when the weight of the cabin is resting upon the foot portions 29, suitable anti-friction rollers 39 are provided. These rollers 39 preferably are mounted upon bearing pins 41 in a recess in the upper face of the foot portions 29, and are arranged to engage the flat face portions 24 of the respective lugs 21. The provision of right and left hand locking devices insures retention of the cabin and prevents longitudinal shifting thereof.

To insure discharge of the cabin 15 from the opening 13 in the fuselage upon release of the locking devices 26, detachable yieldable means is provided to forcibly urge said cabin therefrom. To this end, a hook or lug 42 is secured to each end wall of the cabin below the roof for receiving thereover an eyelet 43 carried on the end of a suitable cable 44. The cable 44 is mounted upon an automatic spring wound drum 45 built within the fuselage adjacent its lower side. The cables 44 tend to draw the cabin downwardly at all times and when said cabin is locked in place it is held tightly against the locking members 29.

To check the descent of the cabin, when released from the fuselage while the flying machine is in flight, a parachute 46 of known construction is provided which automatically opens upon the initial falling of the cabin. The parachute 46 normally is folded to lie upon a suitable frame 47 preferably formed of steel or duralumin channel members, and it is secured to said frame preferably by cords having their ends attached in any approved manner, such as for example, by suitable U-bolts 48. When the cabin drops out of the opening 15 a partial vacuum is created with said opening which tends to partially lift the parachute from the frame-work sufficiently to permit its being inflated by the relatively uprushing air as the cabin continues its descent.

The entire shock or strain imposed upon the cabin during the opening of the parachute is transmitted to the frame 49 at the bottom of the cabin. This is effected by providing, adjacent each corner of the frame 47, a downwardly extending vertical rod 51, having a flange or collar 52 adjacent its lower end which co-acts with a coil spring 53 mounted within a receptacle 54 rigidly secured to frame 49. It can readily be understood that the dash-pot thus provided absorbs the shock or strain imposed upon the frame 47. A construction of this character permits the building of the cabin 15 of comparatively light material, thus reducing the entire weight of the device, and eliminating the possibility of causing injury to the cabin or parachute when the latter opens.

The rods 51 preferably extend below the collar or flange 52 and each is formed with an enlarged substantially conical head 55 which projects below the bottom of the cabin. When the cabin lands upon a surface the heads 55 serve as skids and the shock of landing also is absorbed by the dash pots. It is desirable that the cabin be made to exclude water to insure buoyancy in the event of landing upon water. Additional bouyancy is afforded the cabin by providing suitable vacuum tanks 56 which preferably are located beneath the passenger seats 57, or other equipment contained within the cabin.

Although an exemplary form of the invention has been illustrated in the drawings and described in detail in the foregoing specification, it is to be understood that the invention resides in the provision of yieldable means for mounting a parachute on a cabin having yieldable landing skids, and automatic means for effecting release of said cabin while the flying machine is in flight, and it is not desired to limit the invention to the exact structure shown, as various modifications in detail may be incorporated without departing from the spirit of the invention or the scope of the appended claims.

I claim:

1. In aircraft, a detachable cabin, a frame yieldingly secured to said cabin, a parachute secured to and adapted to lie on said frame, and said yieldable securing means including means depending below said cabin to absorb the landing shock of said cabin.

2. In a detachable cabin for flying machines including a floor and a top, a frame overlying said top, a parachute adapted to lie upon said frame when closed, yieldable means connecting said frame with the floor of said cabin, said yieldable means absorbing the shock of the opening of said parachute, and means extending below said cabin whereby said yieldable means may absorb the shock of landing.

3. In a flying machine having means for detachably securing a cabin therein, said means including a plurality of vertically disposed oscillatably rotatable shafts mounted in the fuselage of said flying machine, recessed lugs on said cabin, and means on said shafts adapted to engage beneath said lugs to support said cabin in place, said means also engaging in the recesses in said lugs to prevent shifting of the cabin.

4. In aircraft, a parachute, a frame to which said parachute is secured, a plurality of depending rods on said frame, a cabin supported by said rods, said rods being yieldably connected to the floor structure only of the cabin, and means on the rods depending below said floor structure adapted to absorb the shock of landing when said cabin is detached from the aircraft.

5. A detachable cabin for a flying machine including a substantially rigid floor, a frame on the roof of said cabin, a parachute secured to said frame, rods depending from said frame having enlarged free ends extending below said cabin, a plurality of housings secured to the floor of said cabin each adapted to receive the enlarged end of one of said rods, and a spring interposed between each enlarged end and its respective housing providing a yieldable connection therebetween to absorb the shock of opening of the parachute and of landing.

6. In a flying machine including a fuselage having means for detachably securing a cabin therein, said means comprising, in combination, a plurality of operator controlled oscillatably rotatable shafts mounted in the fuselage of said flying machine, a plurality of lugs on said cabin, a recess in the under side of each lug, and means mounted on and movable with said shafts adapted to engage beneath and co-operate with said lugs to hold the cabin in place, said means having upwardly extending projections thereon adapted to engage in said recesses to prevent shifting of the cabin relative to the fuselage.

7. In aircraft, a detachable cabin, a parachute, a frame on said cabin to which said parachute is secured, rods depending from said frame, said rods extending below the cabin, and yieldable means connecting said rods to the floor structure only of said cabin, said yieldable means absorbing the shock of opening of the parachute and of landing when said cabin is detached from the aircraft.

8. In aircraft, a detachable cabin, a parachute, a frame on said cabin to which said parachute is secured, rods depending from said frame, said rods extending below said cabin, and yieldable means connecting said rods to said cabin, said yieldable means absorbing the shock of opening of the parachute and of landing after said cabin has been detached from the aircraft.

9. In aircraft, a cabin, means detachably securing said cabin in an opening in said aircraft, said means comprising, in combination, a plurality of vertically disposed oscillatably rotatable shafts mounted in said aircraft, a cabin supporting element on the lower end of each of said shafts, lugs on said cabin adapted to have the supporting elements in engagement therewith when said elements are in position to support said cabin, and a projection on each supporting element adapted to engage in a recess in the respective lug to prevent shifting of the cabin relative to the aircraft.

10. In aircraft, a cabin, means detachably securing said cabin in an opening in said aircraft, said means comprising, in combination, a plurality of vertically disposed oscillatably rotatable shafts mounted in said aircraft, a cabin supporting element on the lower end of each of said shafts, lugs on said cabin adapted to have the supporting elements in engagement therewith when said elements are in position to support said cabin, a projection on each supporting element adapted to engage in a recess in the respective lug to prevent shifting of the cabin relative to the aircraft, and anti-friction means to facilitate disengagement of the supporting elements.

11. In aircraft having a detachable cabin, means supporting said cabin in an opening in said aircraft, said means, comprising, in combination, a plurality of lugs on the side walls of said cabin adjacent the floor, lug engaging elements carried in said opening, one adapted to be positioned beneath each lug to support said cabin, means on each engaging element adapted to co-operatively engage in a recess in its associated lug to prevent shifting of said cabin relative to said opening, means operable to move said engaging elements into and out of engagement beneath said lugs, and anti-friction means carried by said engaging elements to facilitate easy engagement or disengagement of said engaging elements with said lugs.

12. In aircraft having a detachable cabin, means supporting said cabin in an opening in said aircraft, said means comprising, in combination, a plurality of lugs on said cabin, lug engaging elements carried in said opening, one adapted to be positioned beneath each lug to support said cabin, means on each engaging element adapted to co-operatively engage in a recess in its associated lug to prevent shifting of said cabin relative to said opening, means operable to move said engaging elements into and out of engagement beneath said lugs, and anti-friction means on said engaging elements to facilitate easy engagement or disengagement of said engaging elements with said lugs.

13. In aircraft having a detachable cabin, means supporting said cabin in an opening in the under side of the fuselage of said aircraft, said means comprising, in combination, a plurality of lugs on said cabin, each of said lugs having a substantially flat bottom face and a recess therein opening on one side, a plurality of operator controlled supporting elements in said opening adapted to be positioned one beneath each lug to retain said cabin in said opening, and a projection on each supporting element adapted to engage in the recess in the respective lug to insure retention of the lugs over the respective supporting element, said supporting elements and projections thereon being movable out of the path of said lugs to release said cabin.

14. In aircraft having a detachable cabin, means supporting said cabin in an opening in the underside of the fuselage of said aircraft, said means comprising, in combination, a plurality of lugs on said cabin, each of said lugs having a substantially flat bottom face and a recess therein opening on one side, a plurality of operator controlled supporting elements in said opening adapted to be positioned one beneath each lug to retain said cabin in said opening, a projection on each supporting element adapted to engage in the recess in the respective lug to insure retention of the lugs over the respective supporting element, said supporting elements and projections thereon being movable out of the path of said lugs to reelase said cabin, and a parachute on said cabin adapted to open to retard descent of said cabin.

ROBERT M. THOMSON.